US012762223B2

(12) United States Patent
Valencia Reyes et al.

(10) Patent No.: US 12,762,223 B2
(45) Date of Patent: Oct. 13, 2026

(54) SYSTEMS AND METHODS FOR MANAGING OPERATIONS OF DISCRETE GRAPHICS COMPONENTS OF DATA PROCESSING SYSTEMS

(71) Applicant: Dell Products L.P., Round Rock, TX (US)

(72) Inventors: Luis Antonio Valencia Reyes, Waxahachie, TX (US); Vinodkumar Vasudev Ottar, Mckinney, TX (US); Abeye Teshome, Austin, TX (US); Richard M. Tonry, Georgetown, TX (US); Bassem El-Azzami, Austin, TX (US); Mohit Arora, Frisco, TX (US); Adolfo Sandor Montero, Pflugerville, TX (US); Rajaravi Chandra Kollarapu, Allen, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 18/919,913

(22) Filed: Oct. 18, 2024

(65) Prior Publication Data

US 2026/0111536 A1 Apr. 23, 2026

(51) Int. Cl.
*G06F 21/50* (2013.01)
*G06F 21/30* (2013.01)
(Continued)

(52) U.S. Cl.
CPC ............ *G06F 21/50* (2013.01); *G06F 21/305* (2013.01); *G06F 21/70* (2013.01);
(Continued)

(58) Field of Classification Search
CPC ........ G06F 21/305; G06F 21/50; G06F 21/70; G06F 2221/2141; H04L 63/10; H04L 63/18
See application file for complete search history.

(56) References Cited

U.S. PATENT DOCUMENTS 8,042,182 B2 10/2011 Milani Comparetti et al.
8,615,785 B2 12/2013 Elrod et al.
(Continued)

OTHER PUBLICATIONS

Ahmad Muzaffar Bin Baharudin. (Nov. 20, 2023). "How to optimize your data storage workload by offloading data within watsonx.data", IBM. watsonx.data. <https://community.ibm.com/community/user/watsonx/blogs/ahmad-muzaffar-bin-baharudin/2023/11/18/how-to-offload-data-from> retrieved on Aug. 28, 2024 (4 pages).
(Continued)

*Primary Examiner* — Robert B Leung
(74) *Attorney, Agent, or Firm* — WOMBLE BOND DICKINSON (US) LLP

(57) ABSTRACT

Methods and systems for managing operation of a data processing system are disclosed. To manage operation of the data processing system, policy management events may be identified by a management controller of the data processing system based on a set of control policies. Based on the identified policy management event, the management controller may identify a desired state for a discrete graphics component of the hardware resources of the data processing system and perform various action sets to update operation of the discrete graphics component to meet the desired state. By doing so, an updated graphics component may be obtained and used for providing computer implemented services as desired.

20 Claims, 6 Drawing Sheets

(51) Int. Cl.
*G06F 21/70* (2013.01)
*H04L 9/40* (2022.01)

(52) U.S. Cl.
CPC ...... *G06F 2221/2141* (2013.01); *H04L 63/10* (2013.01); *H04L 63/18* (2013.01)

(56) References Cited

U.S. PATENT DOCUMENTS

| | | | |
|---|---|---|---|
| 8,924,620 B2 | 12/2014 | Harriman et al. | |
| 9,215,244 B2 | 12/2015 | Ayyagari et al. | |
| 9,734,169 B2 | 8/2017 | Redlich et al. | |
| 10,176,308 B2 | 1/2019 | Mintz et al. | |
| 10,298,670 B2 | 5/2019 | Ben-Shael et al. | |
| 10,534,417 B1 | 1/2020 | Ortega Gutierrez | |
| 10,671,765 B2 | 6/2020 | Swierk et al. | |
| 11,036,902 B2 | 6/2021 | Nicholas | |
| 11,102,122 B2 | 8/2021 | Seed et al. | |
| 11,134,380 B2 | 9/2021 | Fox et al. | |
| 11,487,274 B2 | 11/2022 | Valder et al. | |
| 11,792,267 B2 | 10/2023 | Kreiner et al. | |
| 2011/0087387 A1 | 4/2011 | Safa-Bakhsh et al. | |
| 2013/0017806 A1* | 1/2013 | Sprigg | H04M 1/66<br>455/411 |
| 2013/0225151 A1* | 8/2013 | King | G06Q 10/10<br>455/419 |
| 2014/0189778 A1* | 7/2014 | Li | G06F 21/554<br>726/1 |
| 2015/0208356 A1* | 7/2015 | Niu | H04W 52/0277<br>455/574 |
| 2016/0119358 A1* | 4/2016 | Laadan | H04L 63/102<br>726/28 |
| 2017/0012981 A1* | 1/2017 | Obaidi | H04L 63/20 |
| 2017/0097875 A1 | 4/2017 | Jess | |
| 2017/0118649 A1 | 4/2017 | Yang | |
| 2018/0039946 A1 | 2/2018 | Bolte et al. | |
| 2018/0124461 A1* | 5/2018 | Vivien | H04N 21/4332 |
| 2019/0251275 A1 | 8/2019 | Ramrakhyani | |
| 2020/0233983 A1* | 7/2020 | Robison | G06F 21/72 |
| 2021/0034048 A1 | 2/2021 | Hajizadeh | |
| 2021/0073211 A1 | 3/2021 | Wright, Sr. | |
| 2021/0126823 A1* | 4/2021 | Poess | H04W 4/029 |
| 2022/0038659 A1 | 2/2022 | Michel | |
| 2024/0020050 A1 | 1/2024 | Colline | |
| 2024/0323016 A1 | 9/2024 | Lambert | |
| 2025/0245061 A1* | 7/2025 | Sinha | G06F 9/4881 |

OTHER PUBLICATIONS

Belal Mahmoud. (Jan. 19, 2024). "A Complete Guide to AI Identity Verification", KYC AML Guide. <https://kycaml.guide/blog/a-complete-guide-to-ai-identity-verification/#:~: text=The%20use%20of%20artificial%20intelligence,get%20scanned%20in%20no%20time> retrieved on Aug. 28, 2024 (4 pages).

Chow et al. (Dec. 6, 2023). "How we used OpenBMC to support AI inference on GPUs around the world", Cloudflare, The cloudflare Blog. <https://blog.cloudflare.com/how-we-used-openbmc-to-support-ai-inference-on-gpus-around-the-world/> retrieved on Aug. 28, 2024 (6 pages).

Cisco. "NextGen Out-of-Band Data Center Management Network with EVPN VXLAN", Jun. 23, 2023, <https://www.cisco.com/c/en/us/td/docs/dcn/whitepapers/nextgen-oob-datacenter-mgmt-nw-with-evpn-vxlan.html> retrieved on Aug. 28, 2024 (35 pages).

Perle Systems. "Out-of-Band Management: What is it and why do I need it?" webpage <https://www.perle.com/supportfiles/out-of-band-management.shtml>, 3 pages, May 20, 2024, retrieved from Internet Archive Wayback Machine <https://web.archive.org/web/20240520174409/https://www.perle.com/supportfiles/out-of-band-management.shtml> on Aug. 28, 2024.

* cited by examiner

SYSTEMS AND METHODS FOR MANAGING OPERATIONS OF DISCRETE GRAPHICS COMPONENTS OF DATA PROCESSING SYSTEMS

FIELD

Embodiments disclosed herein relate generally to managing a data processing system. More particularly, embodiments disclosed herein relate to systems and methods for managing operations of discrete graphics components of hardware resources of data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
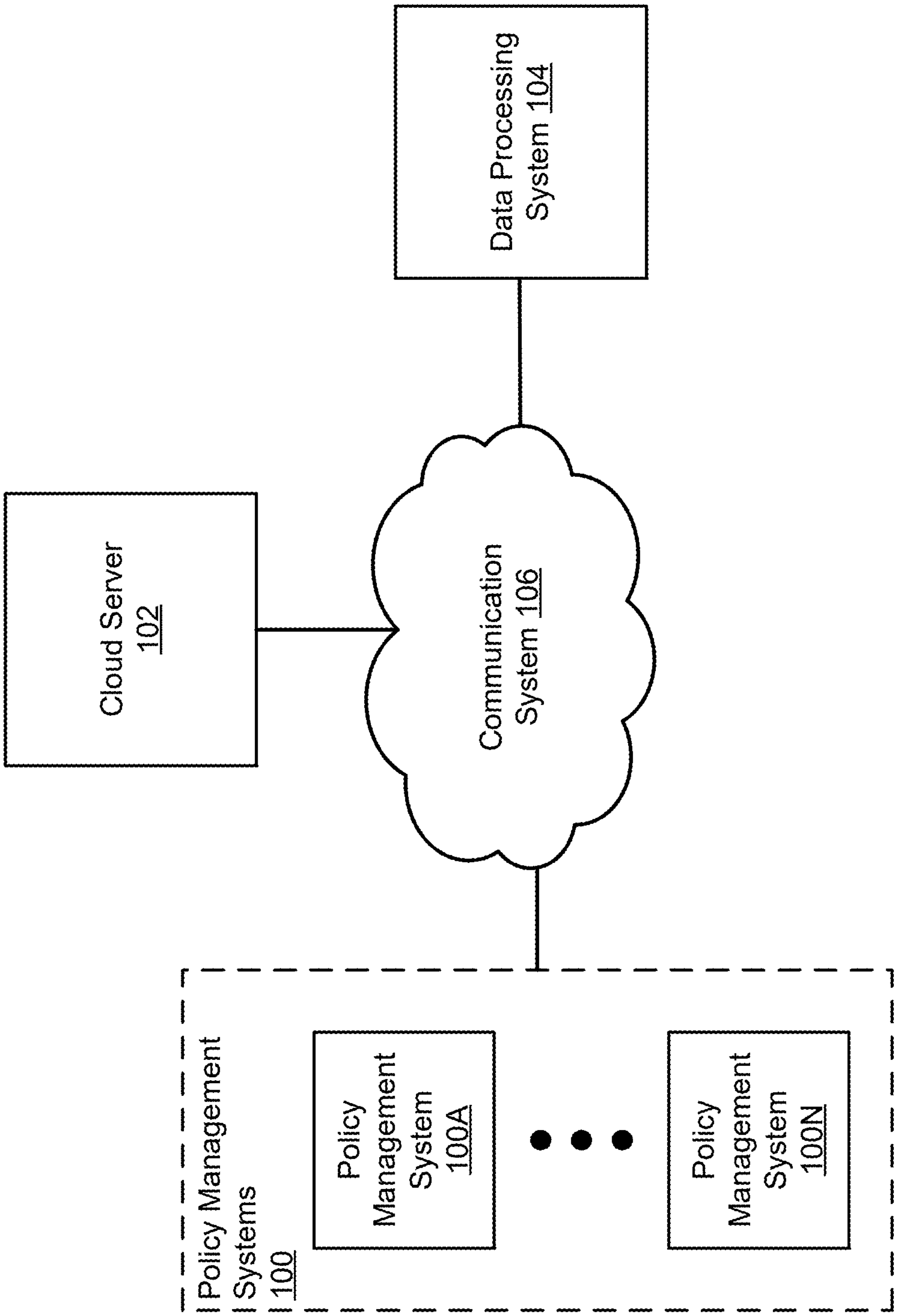
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing (operation of) data processing systems. The data processing systems may provide computer implemented services to users of the data processing systems. The computer implemented services may include any quantity and type of such services. To provide the computer implemented services, data processing systems may include any number of hardware components (e.g., processors, memory modules, storage devices, communication device, etc.). The hardware components may support execution of any number and types of application (e.g., software components).

The computer implemented services that may be provided may include, for example, entertainment services (e.g., media platforms, video games, etc.) for a user of the data processing system. To provide the entertainment services, the hardware components of the data processing system may include a discrete graphics component that manages a graphical interface (e.g., display monitor or screen) of the data processing system. For example, the discrete graphics component may perform 3-dimensional (3D) rendering processes in parallel with the processor in order to generate and display a 3D imaging and/or video feed (e.g., such as a video game program).

Limitations and/or restrictions on access to and/or operation of data processing systems may be desirable by a user and/or administrator of the data processing systems. For example, an administrator of the data processing system may implement restrictions on access to and/or operation of certain functions of the data processing system by specific users (e.g., using customized security credentials for different users of the data processing system). For example, a parent may implement time-based restrictions on a child's access to operation of the data processing system. The time-based restrictions may be implemented by an operating system hosted by the data processing system and/or by an application (e.g., for which restrictions are to be implemented for certain users).

Implementing access restrictions based on security credentials may present a problem if the security credentials for users without restrictions become known by restricted users. For example, if security credentials (e.g., user login and password) for an administrator (e.g., a parent) of the data processing system become accessible by a restricted user (e.g., a child), the restricted user may gain unrestricted access to and/or operation of the data processing system after entering the security credentials for the administrator.

In order to decrease the likelihood of unauthorized access to and/or unrestricted operation of data processing systems, access control policies for the data processing system may be established and enforced using out-of-band components that verifies operations (e.g., of the data processing system) to be in compliance with the corresponding access control policies and implements restrictions of operation based on the access control policies. By doing so, managing restrictions on operations of data processing systems may be implemented without utilizing an operating system of the data processing system and/or in the event that the in-band components of the data processing system are not functional (e.g., powered off, lacking network connection, etc.).

By utilizing out-of-band components of the data processing system, authorized modifications (e.g., restrictions, limitations, etc.) to operations of hardware components of the data processing system may be managed remotely (e.g., from a device with a different geographic location from the data processing system) and the likelihood of unauthorized access to and/or operations of the data processing system may be decreased while facilitating implementation of restrictions for operation of the data processing system.

By doing so, embodiments disclosed herein may provide a system for managing (operation of) a data processing system based on access control policies corresponding to different types of events. The access control policies may be implemented in a seamless manner to update operations of the data processing system. Thereby, decreasing the likelihood of unrestricted access to and/or operation of the data processing system and increasing the likelihood of seamlessly implementing access control policies to update operations of the data processing system. Once the access control policies are implemented (e.g., an action set to update operation of the data processing system defined by a corresponding access control policy), a likelihood that the data processing system may provide more desirable computer implemented services may be increased.

In an embodiment, a method for managing operation of a data processing system is provided. The method may include: identifying, by a management controller and based on a set of control policies, an occurrence of a policy management event; based on the occurrence of the policy management event: identifying, by the management controller and using the set of control policies, a desired state for a discrete graphics component of hardware resources of the data processing system; updating, by the management controller and based on the desired state, operation of the discrete graphics component to obtain an updated discrete graphics component; and providing, using the updated discrete graphics component, computer implemented services to a user of the data processing system, the computer implemented services conforming to limits specified by the set of control policies.

The set of control policies may be defined by a first user of the data processing system and enforced on a second user of the data processing system.

The set of control policies may define parental limits on use of the data processing system by the second user.

The parental limits may define, at least in part, periods of time when at least one function of the data processing system is to be unavailable to the second user.

The at least one function of the data processing system may depend on access to functionality of the discrete graphics component, and the updated discrete graphics component bars use of the functionality of the discrete graphics component.

Updating the operation of the discrete graphics component may include: depowering the discrete graphics component during a period of time specified by the set of control policies.

Updating the operation of the discrete graphics component may also include: disabling a portion of functionality of the discrete graphics component.

Updating the operation of the discrete graphics component may also include: blacklisting at least a portion of applications hosted by the hardware resources from invoking functionality of the discrete graphics component.

The data processing system may include a network module adapted to separately advertise network endpoints for the management controller and hardware resources of the data processing system, the network endpoints being usable by a server to address communications to the hardware resources using an in-band communication channel and the management controller using an out-of-band communication channel.

The management controller and the network module may be on separate power domains from the hardware resources so that the management controller and the network module may be operable while the hardware resources are inoperable.

The out-of-band communication channel may run through the network module, and the in-band communication channel that services the hardware resources may also run through the network module.

The network module may host a transmission control protocol/internet protocol (TCP/IP) stack to facilitate network communications via the out-of-band communication channel.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Figure 1B:
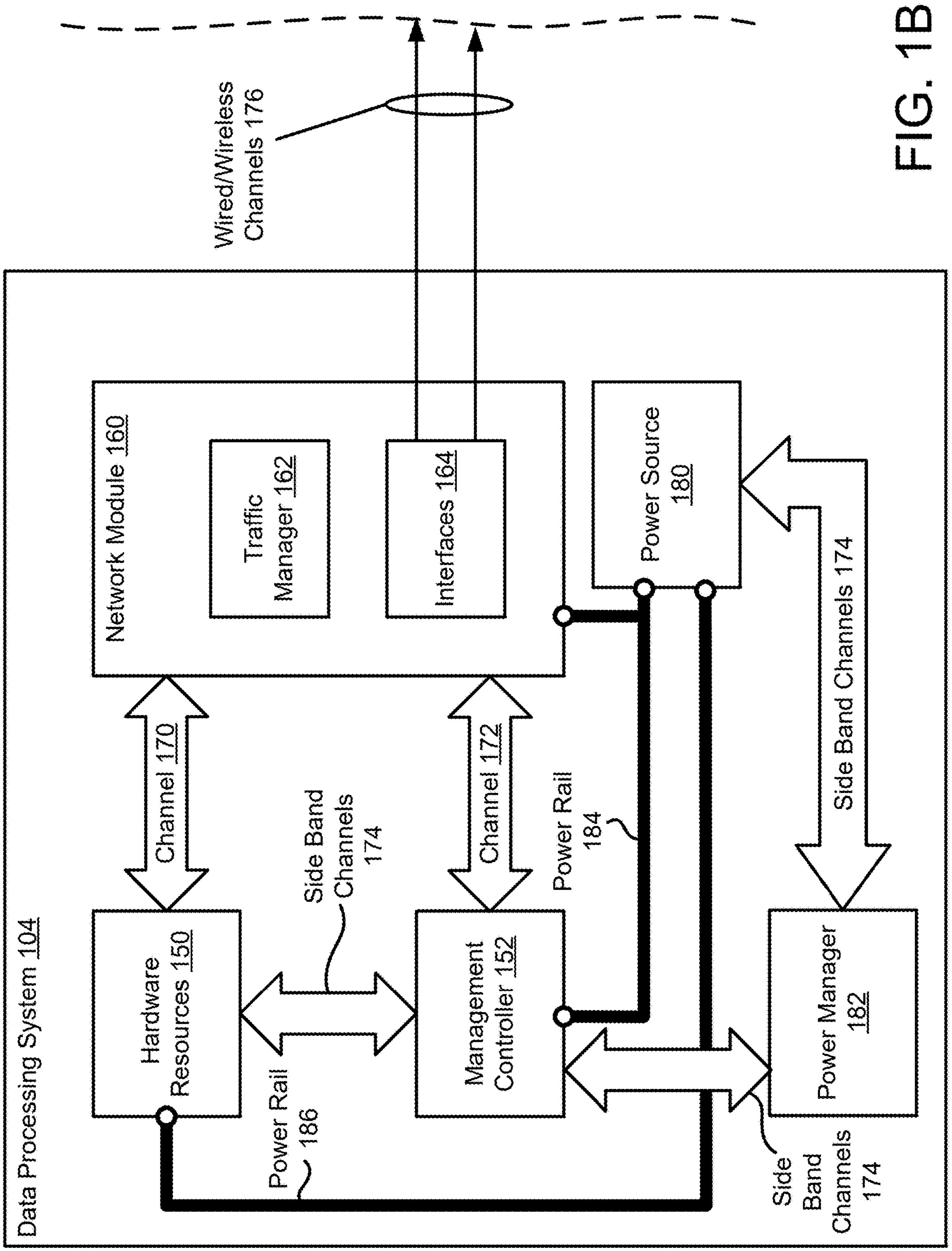
FIG. 1B shows a block diagram illustrating a data processing system in accordance with an embodiment.

Turning to FIG. 1A, a block diagram illustrating a system in accordance with an embodiment is shown. The system shown in FIG. 1A may provide for management of data processing systems that may provide, at least in part, computer-implemented services. The system may include any number of data processing system 100 (e.g., computing devices) that may each include any number of hardware components (e.g., processors, memory modules, storage devices, communications devices). The hardware components may support execution of any number and types of applications (e.g., software components). Changes in available functionalities of the hardware and/or software components may provide for various types of different computer-implemented services to be provided over time. Refer to FIG. 1B for additional details regarding data processing system 100.

Data processing system 100 may provide computer implemented services such as, for example, entertainment and/or gaming services (e.g., video games, various types of media, etc.). To provide entertainment and/or gaming services, data processing system 100 may include a discrete graphics component (e.g., one of the hardware components of data processing system 100) that manages operation of a graphical interface (e.g., visual display, screen, etc.) of the data processing system. For example, the discrete graphics component may perform graphic rendering processes or other high performance processes to generate and display images on the graphical interface. For example, during operation of a video game program by data processing system 100, the discrete graphics component may perform 3D rendering processes to display and continuous update 3D images of a character (e.g., operated by the user of the data processing system) in the video game.

Restrictions on operations of and/or the computer implemented services provided by data processing system 100 may be advantageous for various reasons. For example, an administrator of data processing system 100 may implement restrictions on functionality of the discrete graphics component during a period of time to limit a user's (e.g., of data processing system 100) access to and/or operation of data processing system 100 for entertainment and/or gaming services.

The restrictions for control and/or operation of a data processing system may be specified for individual users (e.g., via personal login credentials) and may be implemented by an operating system of the data processing system. For example, a child may gain access to and operation of data processing system 104 using the child's login credentials. However, restrictions on operations of hardware components, such as the discrete graphics component, may be implemented for a period of time, for example, during the hours of 10 P.M. and 8 A.M. Thereby, disabling the child's ability to play video games via operation of data processing system 104.

However, placing restrictions based on individual user's credentials may become an ineffective manner of implementing restrictions if, for example, an unrestricted user's credentials are disclosed (e.g., advertently or inadvertently) to an intended restricted user. For example, if the login and password information for an administrative user (with unrestricted access) is obtained by another user (with restricted access), the other user may input the login and password information to obtain unrestricted access to and operation of data processing system 104.

In general, embodiments disclosed herein may provide methods, systems, and/or devices for managing operation of a data processing system. To manage operation of the data processing system, a system in accordance with an embodiment may utilize out-of-band components of data processing system to implement control policies to update operation of a discrete graphics component of the hardware resources of the data processing system. The data processing system may include a management controller that may communicate with other devices and/or the discrete graphics component without traversing in-band communication channels and without utilizing in-band components. For example, the management controller may monitor operations of the data processing system to identify any occurrences of policy management events and based on identified occurrences of policy management events, identify modifications to operations of the discrete graphics component.

By doing so, restrictions on functionality of the discrete graphics component may be implemented without utilizing in-band components of the data processing system, thereby decreasing the likelihood of potential issues implementing restrictions of the data processing system and/or increasing the likelihood of the data processing system providing desirable computer implemented services to a user in conformity with the limitations established by the control polices.

Therefore, out-of-band components may be used to implement control policies for a data processing system (e.g., 104) to update operation of the discrete graphics component of data processing system 104. To do so, an occurrence of a policy management event may be identified and a desired state for the discrete graphics component may be identified based on the control policy corresponding to the policy management event.

The identified policy management event may be utilized by the out-of-band components to determine which of the control policies (of a set of control policies) for the data processing system to implement. The set of control policies may specify an outcome and/or action sets to be performed to update operation of the discrete graphics component of the data processing system. By updating operation of the discrete graphics component (using the out-of-band components of data processing system 104), computer implemented services that conform to limits specified by the set of control policies may be provided.

To perform the above-mentioned functionality, the system of FIG. 1A may include policy management systems 100, cloud server 102, and/or data processing system 104. Policy management systems 100, cloud server 102, and/or data processing system 104, and/or any other type of devices not shown in FIG. 1A may perform all, or a portion of the computer-implemented services independently and/or cooperatively. Each of these components is discussed below.

Data processing system 104 may include any number and/or type of data processing systems (e.g., other data processing systems, management systems, storage devices, user devices, etc.) that may provide computer implemented services, based at least in part on control policies corresponding to updating operation of a discrete graphics component of hardware resources of the data processing system. To do so, data processing system 104 may include out-of-band components (e.g., a network module, a management controller, etc.), and functionality that may allow data exchange between the out-of-band components independently from in-band components of data processing system 104. For more information regarding out-of-band components of data processing system 104, refer to the discussion of FIG. 1B.

For example, the out-of-band components of data processing system 104 may (i) obtain a set of control policies for data processing system 104, (ii) monitor operation of data processing system 104, (iii) identify an occurrence of a policy management event, (iv) identify a desired state for a discrete graphics component of hardware resources of the data processing system, (v) update operation of the discrete graphics component to obtain an updated discrete graphics component, and/or (vi) perform other actions to facilitate policy management services to provide computer implemented services.

To provide control policies to data processing system 104, the system may include policy management systems 100. Policy management systems 100 may include any number and/or type of policy management systems (e.g., 100A-100N). To perform its functionality, policy management systems 100 may communicate control policies for data processing system 104 to cloud server 102.

To provide policy management services, policy management systems 100 may, for example, (i) receive user input indicating control policies to modify operation of a data processing system, (ii) identify a data processing system (e.g., 104) in which operation restrictions may be established, (iii) provide communications to cloud server 102 indicating policy control requests for data processing system 104, and/or (iv) perform other actions to facilitate policy management services.

Cloud server 102 may include any number and/or type of cloud servers that may participate in providing computer implemented services. Cloud server 102 may store and manage device registrations and/or other information related to devices authorized to establish control policies for data processing system 104. To perform its functionality, cloud server 102 may communicate (e.g., exchange data) with the out-of-band components of data processing system 104 using out-of-band communication channels. For example, cloud server 102 may provide control policies for data processing system 104 via a management controller of data processing system 104 (e.g., bypassing any in-band components of data processing system 104).

To facilitate policy management services, cloud server 102 may, for example, (i) receive a request to modify (e.g., restrict, limit, etc.) operations of data processing system 104 (and/or components of data processing system 104), (ii) identify a management controller of data processing system 104, (iii) provide control policies for implementation to a management controller of data processing system 104, and/or (iv) perform other actions that may facilitate policy management services.

Thus, the operation of data processing system 104 may be managed according to control policies implemented based on occurrences of policy management events. The control policies for data processing system 104 may be implemented using out-of-band methods (e.g., using out-of-band components and via out-of-band communication channels). By doing so, restrictions on the operations of data processing system 104 may be more likely to be implemented in a seamless manner without utilizing in-band components of data processing system 104, and/or data processing system 104 may be more likely to provide the desired computer implemented services (e.g., that conform to limits specified by the control policies).

Figure 3:
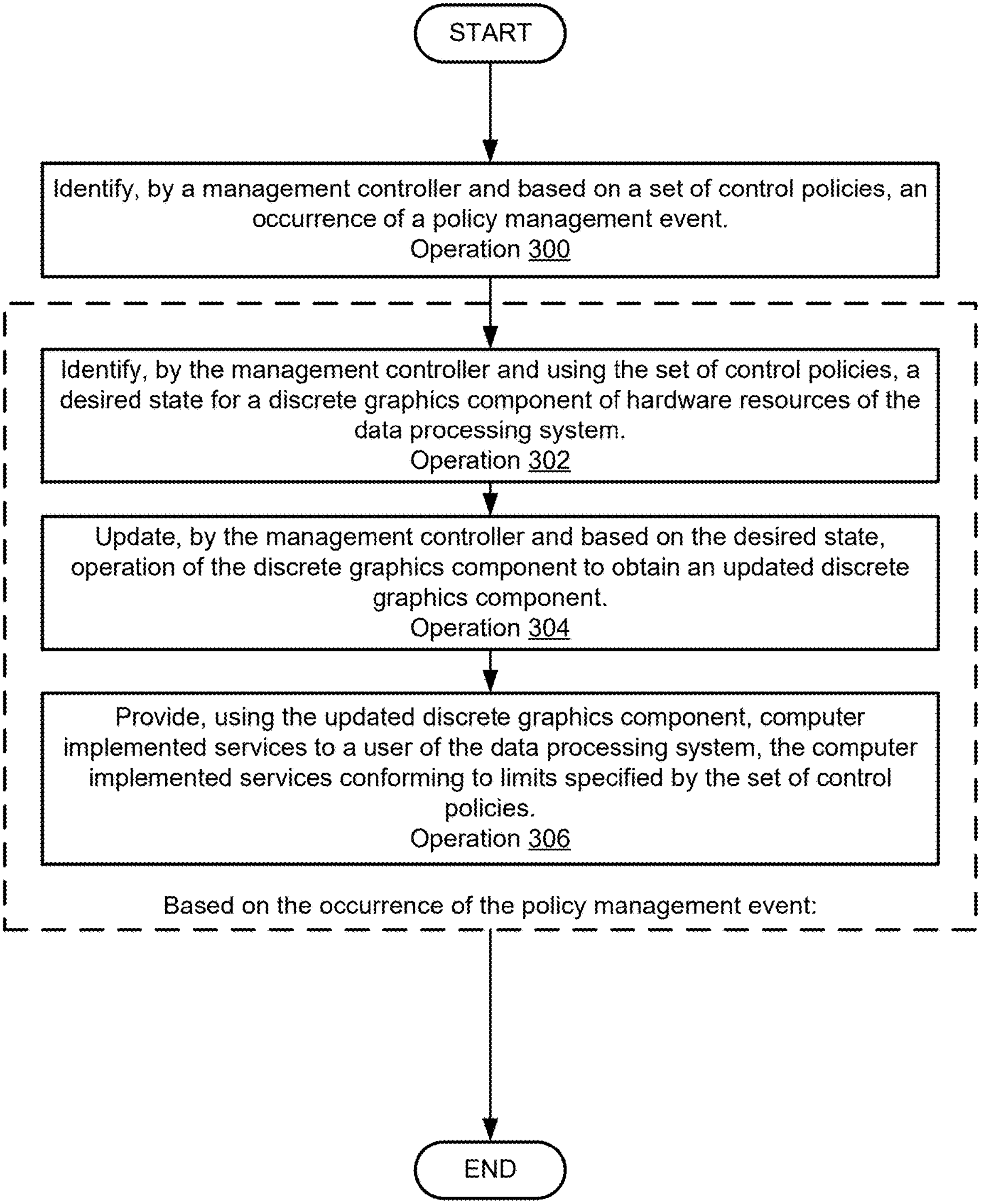
FIG. 3 shows a flow diagram illustrating a method of managing operation of a data processing system in accordance with an embodiment.

When providing their functionality, any of policy management systems 100, cloud server 102, and/or data processing system 104 may perform all, or a portion of the methods shown in FIG. 3.

Any of (and/or components thereof) policy management systems 100, cloud server 102, and/or data processing system 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

In an embodiment, one or more of policy management systems 100, cloud server 102, and/or data processing system 104 are implemented using an internet of things (IoT) device, which may include a computing device. The IoT device may operate in accordance with a communication model and/or management model known to policy management systems 100, cloud server 102, and/or data processing system 104, and/or other devices.

Any of the components illustrated in FIG. 1A may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and/or types of communication protocols (e.g., such as the internet protocol). Communication system 106 may include any number of in-band communication channel and/or out-of-band communication channels.

While illustrated in FIG. 1A as including a limited number of specific components, a system in accordance with an embodiment may include fewer, additional, and/or different components than those illustrated therein. For example, while the system of FIG. 1A shows a single data processing system (e.g., 104), it will be appreciated that the system may include any number of data processing systems.

Turning to FIG. 1B, a diagram illustrating data processing system 104 in accordance with an embodiment is shown. Data processing system 104 may be similar to any of data processing systems 104 shown in FIG. 1A.

To provide computer-implemented services, data processing system 104 may include any quantity of hardware resources 150. Hardware resources 150 may be in-band hardware components, and may include a processor operably coupled to memory, storage, and/or other hardware components. Hardware resources 150 may (e.g., via the processor) provide the computer-implemented services desired by users of data processing system 104.

The processor may host various management entities such as operating systems, drivers, network stacks, and/or other software entities that provide various management functionalities. For example, the operating system and drivers may provide abstracted access to various hardware resources.

To facilitate communication, hardware resources 150 may host a network stack that may facilitate packaging, transmission, routing, and/or other functions with respect to exchanging data with other devices. For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. Additionally, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 104) to another device via any number of intermediate networks (e.g., via wired/wireless channels 176 that are part of the networks).

To reduce the likelihood of the applications and/or other in-band entities from being indirectly compromised, data processing system 104 may include management controller 152 and network module 160. Each of these components of data processing system 104 is discussed below.

Management controller 152 may operate independently from hardware resources 150 and, therefore, hardware resources 150 may not host and/or manage operation of management controller 152. In addition, management controller 152 may be distinct from hardware resources 150 and, therefore, may be physically separate from hardware resources 150. Management controller 152 may also be operably connected to communication components of data processing system 104 via separate channels (e.g., 172) from the in-band components.

Management controller 152 may be implemented, for example, using a system on a chip or other type of independently operating computing device (e.g., independent from the in-band components, such as hardware resources 150, of a host data processing system 104).

Management controller 152 may provide various management functionalities for data processing system 104. For example, management controller 152 may monitor various ongoing processes performed by the in-band component, may manage power distribution, thermal management, and/or other functions of data processing system 104.

To do so, management controller 152 may be operably connected to various components via side band channels 174 (in FIG. 1B, a limited number of side band channels are included for illustrative purposes, it will be appreciated that management controller 152 may communication with other components via any number of side band channels). The side band channels may be implemented using separate physical channels, and/or with a logical channel overlay over existing physical channels (e.g., logical division of in-band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Information provided to the application by management controller 152 may include, for example, instructions for implementation of computer-implemented services desired by users of data processing system 104.

To facilitate communication with other devices, data processing system 104 may include network module 160. Network module 160 may provide communication services for in-band components and out-of-band components (e.g., management controller 152) of data processing system 104.

To provide the above-described functionalities, network module 160 may include traffic manager 162, interfaces 164, and may host an instance of a TCP/IP stack to facilitate communication with other devices independently of any of the in-band components (e.g., does not rely on any hosted software, hardware components, etc.). Accordingly, compromise of any of hardware resources 150 and hosted component may not result in indirect compromise of network module 160, management controller 152, and entities hosted by management controller 152.

Management controller 152 may be operably connected to communication components of data processing system 104 via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

Traffic manager 162 may include functionality to (i) discriminate traffic directed to various network endpoints advertised by data processing system 104, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These components may support any number of wired/wireless channels 176.

Thus, from the perspective of an external device, the in-band components and out-of-band components of data processing system 104 may appear to be two independent network entities, that may independently addressable, and otherwise unrelated to one another.

Network module 160 may utilize the instance of the TCP/IP stack to allow hardware resources 150 and/or management controller 152 to communicate with other devices via packet switched networks and/or other types of communication networks.

To facilitate management of data processing system 140 over time, hardware resources 150, management controller 152 and/or network module 160 may be positioned in separately controllable power domains. By being positioned in these separately controllable power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 104 may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 that is supplied to the power rails (e.g., by providing instructions via side band channels 174). Management controller 152 may cooperate with power manager 182 to manage supply of power to these power domains. Management controller 152 may communicate with power manager 182 via side band channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Figure 2A:
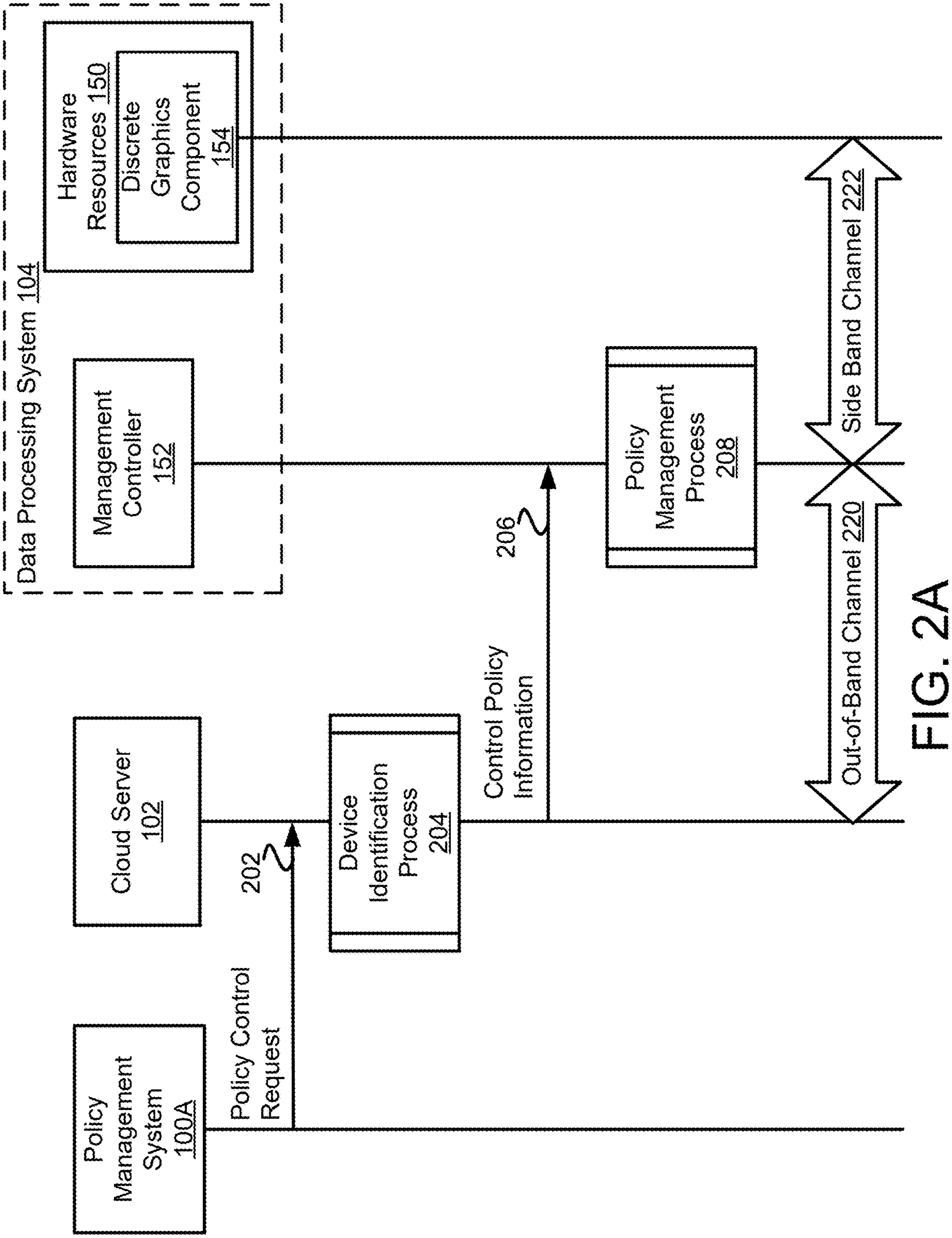
FIGS. 2A-2B show interaction diagrams in accordance with an embodiment.
Figure 2B:
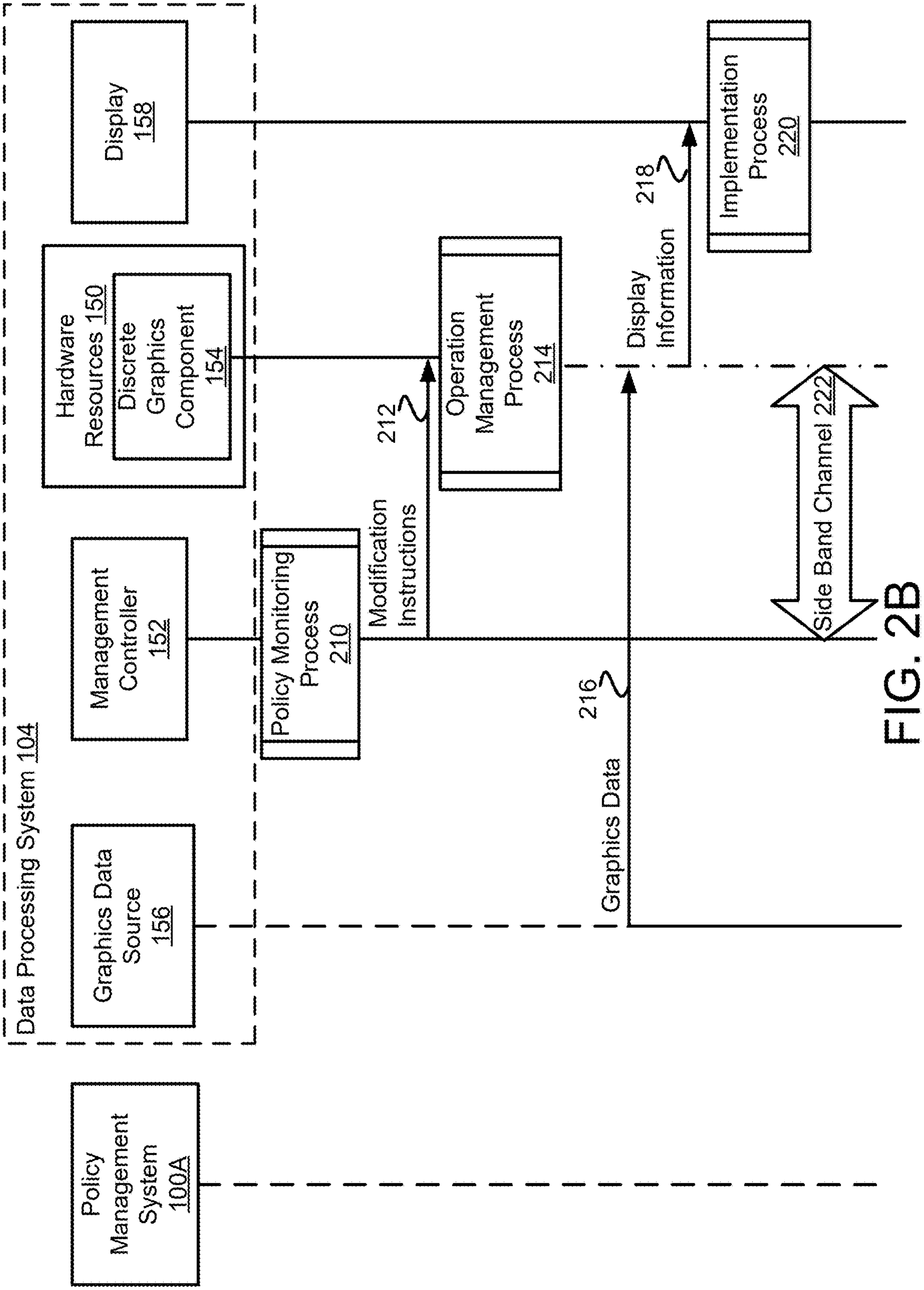

When providing its functionality, management controller 152 may perform all, or a portion, of the methods and operations described in FIGS. 2A-2B.

While illustrated in FIG. 1B with a limited number of specific components, a system may include additional, fewer, and/or different components without departing from embodiments disclosed herein.

To further clarify embodiments disclosed herein, interaction diagrams in accordance with an embodiment is shown in FIGS. 2A-2B. The interaction diagrams may illustrate examples of how data may be obtained and used within the systems of FIGS. 1A-1B.

In the interaction diagrams, processes performed by and interactions between components of a system in accordance with an embodiment are shown. In the diagrams, components of the system are illustrated using a first set of shapes (e.g., 152, 154, etc.), located towards the top of each figure. Lines descend from these shapes. Processes performed by the components of the system are illustrated using a second set of shapes (e.g., 204, 208) superimposed over these lines.

Interactions (e.g., communication, data transmissions, etc.) between the components of the system are illustrated using a third set of shapes (e.g., 202, 206, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 202 may occur prior to the interaction labeled as 204. However, it will be appreciated that the processes and interactions may be performed in different orders, any may be omitted, and other processes or interactions may be performed without departing from embodiments disclosed herein.

The lines descending from some of the first set of shapes (e.g., 100A, 102, etc.) is drawn in dashing to indicate, for example, that the corresponding components may not be (i) operable, (ii) powered on, (iii) present in the system, and/or (iv) not participating in operation of the system for other reasons.

The processes shown in FIGS. 2A-2B may be performed by any entity shown in the systems of FIGS. 1A-1B (e.g., a device similar to one of data processing system 104, cloud server 102, etc.) and/or another entity without departing from embodiments disclosed herein.

Turning to FIG. 2A, a first interaction diagram in accordance with an embodiment is shown. The first interaction diagram may illustrate processes and interactions that may occur during establishment of control policies for a data processing system.

To establish control policies, a policy control request for the data processing system (e.g., 104) may be obtained. At interaction 202, the policy control request may be provided to cloud server 102 by policy management system 100A. For example, the policy control request may be generated and provided to cloud server 102 via (i) transmission via a message, (ii) storing in a storage with subsequent retrieval by cloud server 102, (iii) via a publish-subscribe system where cloud server 102 subscribes to updates from policy management system 100A thereby causing a copy of the policy control request to be propagated to cloud server 102, and/or via other processes. By providing the policy control request to cloud server 102, cloud server 102 may receive the control policy request for the data processing system 104 in order to perform identification processes.

The control policy request may include at least: (i) a set of control policies, (ii) identifier of the intended destination of the set of control policies (e.g., identifier for data processing system 104), (iii) identifier of the requesting entity (e.g., identifier for policy management system 100A), and/or (iv) any other information usable to establish control policies for data processing system 104.

The control policy request may be initiated by an authorized entity (e.g., policy management system 100A) with authorization to initiate and/or provide control policies for the data processing system (e.g., 104). For example, a first user (e.g., administrator) of data processing system 104 may have authority to generate the set of control policies for enforcement during use of data processing system 104 by a second user (e.g., restricted user).

The set of control policies may include different control policies that specify, for example, an outcome and/or actions (e.g., modifications) to be performed to reach a desired state for a discrete graphics component (e.g., 154) of the hardware resources (e.g., 150). The desired state of the discrete graphics component may be a new operating state in which the discrete graphics component may process data differently (e.g., relative to the current operating state). For example, the desired state of discrete graphics component 154 may be disabling all functionality of the discrete graphics component (e.g., powering off discrete graphics component 154).

Each control policy of the set of control policies may be keyed to different types of policy management events such that when a policy management event occurs, the corresponding control policy may be invoked. For example, the policy management events may include periods of time, receival of communications, and/or other various events that may trigger disabling at least one function of data processing system 104 for use by the restricted user (e.g., the second user) of data processing system 104. The use of at least one function of data processing system 104 may depend on access to the functionality of the discrete graphics component. Updating operation of the discrete graphics component may bar, restrict, and/or otherwise limit use of the functionality of the discrete graphics component and therefore may disable availability of the at least one function of data processing system 104.

Once received, cloud server 102 may utilize the policy control request to perform device identification process 204. During device identification process 204, the identifier of the intended destination of the control policies (e.g., data processing system 104) may be used in any type of comparison process to identify an out-of-band component associated with the intended destination of the control policies. For example, cloud server 102 may use the identifier for data processing system 104 to identify the out-of-band component (e.g., management controller 152) associated with data processing system 104.

Following device identification process 204 and at interaction 206, control policy information may be provided to management controller 152 from cloud server 102, for example, by using an out-of-band communication channel (e.g., out-of-band channel 220). The out-of-band communication channel may be similar to channel 172 shown and described in FIG. 1B.

Control policy information may include at least: (i) the set of control policies for data processing system 104, (ii) identifier of the requesting entity (e.g., identifier for policy management system 100A), and/or (iii) any other information usable to establish control policies for data processing system 104.

Following receipt of the control policy information, management controller 152 may perform policy management process 208 to store the control policy information and manage operation of a discrete graphics component (e.g., 154) of hardware resources 150 when a policy management event occurs. Refer to FIG. 2B for additional information regarding identification of policy management events for a data processing system. During policy management process 208, management controller 152 may store a copy of the control policies and configure procedures to verify, evaluate, and/or manage implementation of the control policies regarding operation of discrete graphics component 154.

Thus, as shown in the example of FIG. 2A, control policies for a data processing system may be provided and established by authorized devices (e.g., policy management system 100A) using out-of-band methods. By doing so, control policies may be provided to the data processing system without utilizing in-band components and/or without requiring functionality of the data processing system (e.g., powered on, network connection, etc.).

Turning to FIG. 2B, a second interaction diagram in accordance with an embodiment is shown. The second interaction diagram may illustrate example processes and interactions that may occur during policy management and application to manage operation of a data processing system.

To perform policy management and application, policy monitoring process 210 may be performed by management controller 152. During policy monitoring process 210, management controller 152 may perform any type of monitoring process of the data processing system (e.g., 104) and use the set of control policies to identify whether a policy management event has occurred. For example, management controller 152 may monitor operation of the data processing system 104 and identify an occurrence of a policy management event based on the set of control policies.

As described above, policy management events may include various types of events that trigger invocation of a corresponding control policy (e.g., of the set of control policies). For example, the policy management events may be based on different types of events such as, for example, periods of time, specific communications, etc. and may be keyed to different policies. For example, one policy management event may occur during a specific period of time and the corresponding policy may delineate a desired state of a discrete graphics component and instructions to update operation of the discrete graphics component. As a result of policy monitoring process 210, modification instructions for updating operation of the discrete graphics component may be generated.

At interaction 212, the modification instructions may be provided to discrete graphics component 154 by management controller 152. The modification instructions may be provided to discrete graphics component 154 using a side band communication channel (e.g., side band channel 224). The side band communication channel may be similar to the side band channels 174 shown and described in FIG. 1B.

The modification instructions may include various action sets to be performed by discrete graphics component 154 in order to modify the operation of the discrete graphics component (e.g., 154). For example, the modification instructions may specify access control actions including, at least in part, (i) depowering the discrete graphics component (e.g., for a period of time specified by the set of control policies), (ii) disabling a portion of functionality of the discrete graphics component, (iii) blacklisting at least a portion of application hosted by the hardware resources from invoking functionality of the discrete graphics component, and/or (iv) any other actions to update operation of the discrete graphics component according to the desired (operating) state (e.g., identified based on the set of control policies).

Once received, discrete graphics component 154 may utilize the modification instructions to perform operation management process 214. During operation management process 214, updates and/or modifications (as specified by the modification instructions) to operations of discrete graphics component 154 may be implemented. For example, discrete graphics component 154 may read the modification instructions and perform the action set specified by the modification instructions to update operation of the discrete graphics component.

As a result of operation management process 214, discrete graphics component 154 may enter a new operating state to process data in a manner in accordance with the set of control policies. For example, operation of discrete graphics component 154 may be updated to perform computer implemented services according to limits specified by the control policies. The new operating state of discrete graphics component 154 may be illustrated by a dashed line separated by a dot descending from the first set of shapes (e.g., discrete graphics component 154) after performing operation management process 214.

After a period of time, discrete graphics component 154 may obtain graphics data. At interaction 216, graphics data may be provided to discrete graphics component 154 by graphics data source 156. Graphics data source 156 may provide the graphics data via (i) transmission via a message, (ii) storing in a storage with subsequent retrieval by discrete graphics component 154, (iii) via a publish-subscribe system where discrete graphics component 154 subscribes to updates from graphics data source 156 thereby causing a copy of the graphics data to be propagated to discrete graphics component 154, and/or via other processes.

Once received, at interaction 218, display information may be generated and provided to display 158 by discrete graphics component 154. Discrete graphics component 154 may provide the display information via (i) transmission via a message, (ii) storing in a storage with subsequent retrieval by display 158, (iii) via a publish-subscribe system where display 158 subscribes to updates from discrete graphics component 154 thereby causing a copy of the display information to be propagated to display 158, and/or via other processes.

The display information may include information relating to images to be shown on the display (e.g., 158) of data processing system 104. For example, the display information may include color, brightness, and/or other information for each pixel of images to be shown on display 158. The display information generated and provided to display 158 may depend on the operating state of discrete graphics component. For example, discrete graphics component 154 may be operating with limited functionality (e.g., restrictions on processing portions of graphics data) and as such, may provide display information to display 158 that is allowed (e.g., according to the operating state of the discrete graphics component).

As an additional example, when discrete graphics component 152 is not operational (e.g., powered off, shut down, etc.), the display information may not be provided to display 158, and/or the display information may include pixel of a black out image to be shown on display 158.

Following receipt of the display information, implementation process 220 may be performed to implement the display information for images shown by display 158 as specified by the display instructions. During implementation process 220, display 158 may read the display information and perform any type of execution processes using the display information to show images to a user (e.g., visually interacting with display 158).

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2B may perform various methods to improve secure operations of data processing systems using location data obtained via out-of-band communication methods. By utilizing location data, an out-of-band component of data processing systems may be able to implement security policies corresponding to the proximity of data processing system to trusted device(s) in a timely manner and thereby, may decrease the likelihood of unauthorized access and/or operation of data processing systems.

FIG. 3 illustrates a method that may be performed by the components of the system of FIGS. 1A-2B. In the diagram discussed below and shown in FIG. 3, any of the operations may be repeated, performed in different orders, and/or performed in parallel with or in a partially overlapping in a timely manner with other operations. In the diagram, some of the operations (e.g., individually illustrated using a box) are surrounded by boxes with dashing lines to indicate, for example, components that are applicable to the boxes therein. The method described with respect to FIG. 3 may be performed by a data processing system and/or another device.

Turning to FIG. 3, a flow diagram illustrating a method of managing a data processing system in accordance with an embodiment is shown. The method may be performed, for example, by a data processing system, a management system, a communication system, a management controller, hardware resources, and/or other components illustrated in FIGS. 1A-2B.

Prior to operation 300, a set of control policies for a data processing system may be established. The set of control policies may be established via (i) obtaining the set of control policies from an external device (e.g., policy management system), (ii) receiving communications from the external device via a cloud system (e.g., cloud server), (iii) storing a copy of the set of control policies in a storage device accessible by a management controller of the data processing system, and/or (iv) performing any other methods.

At operation 300, an occurrence of a policy management event may be identified by a management controller. The occurrence of the policy management event may be identified based on a set of control policies. The occurrence of the policy management event may be identified by (i) monitoring operation of the data processing system, (ii) evaluating the set of control policies based on the operation of the data processing system, and/or (iii) performing any other methods.

It will be appreciated that operations 302-306 may be performed based on the occurrence of the policy management event being identified during operation 300.

At operation 302, a desired state for a discrete graphics component of hardware resources of a data processing system may be identified by the management controller. The desired state for the discrete graphics component may be identified using the set of control policies. The desired state for the discrete graphics component may be identified by (i) identifying the control policy corresponding to the identified policy management event, (ii) reading the control policy to identify an outcome and/or action sets to be performed, and/or (iii) performing any other methods.

At operation 304, operation of the discrete graphics component may be updated to obtain an updated discrete graphics component. The operation of the discrete graphics component may be updated by the management controller and based on the desired state.

In a first example, updating the operation of the discrete graphics component may include depowering the discrete graphics component during a period of time specified by the set of control policies. The discrete graphics component may be depowered by providing instructions to the discrete graphics component by the management controller to shut down all operations of the discrete graphics component for a period of time.

In a second example, updating the operation of the discrete graphics component may include disabling a portion of functionality of the discrete graphics component. A portion of functionality of the discrete graphics component may be disabled by providing instructions to the discrete graphics component from the management controller indicating programs and/or specific portions of data to not render.

In a third example, updating the operation of the discrete graphics component may include blacklisting at least a portion of applications hosted by the hardware resources from invoking functionality of the discrete graphics component. For example, the at least a portion of the applications may be blacklisted by providing instructions for limiting any processes of data for specific applications to the discrete graphics component.

At operation 306, computer implemented services may be provided to a user of the data processing system using the updated discrete graphics component. The computer implemented services may conform to limits specified by the set of control policies. The computer implemented services may be provided via (i) ingesting, by the updated discrete graphics component, graphics data (e.g., from a graphics data source), (ii) performing the computer implemented services by the updated discrete graphics component, and/or (iii) performing any other methods.

The method may end following operation 306.

Using the methods illustrated in FIG. 3, embodiments disclosed herein may provide systems and methods usable to manage operations of data processing systems by implementing control policies corresponding to different occurrences of policy management events using out-of-band methods. By implementing control policies, a desired state for a discrete graphics component may be identified and operation of the discrete graphics component may be updated based on the desired state. By updating operation of the discrete graphics component, computer implemented services that confirm to the limits specified by the control policies may be provided.

Figure 4:
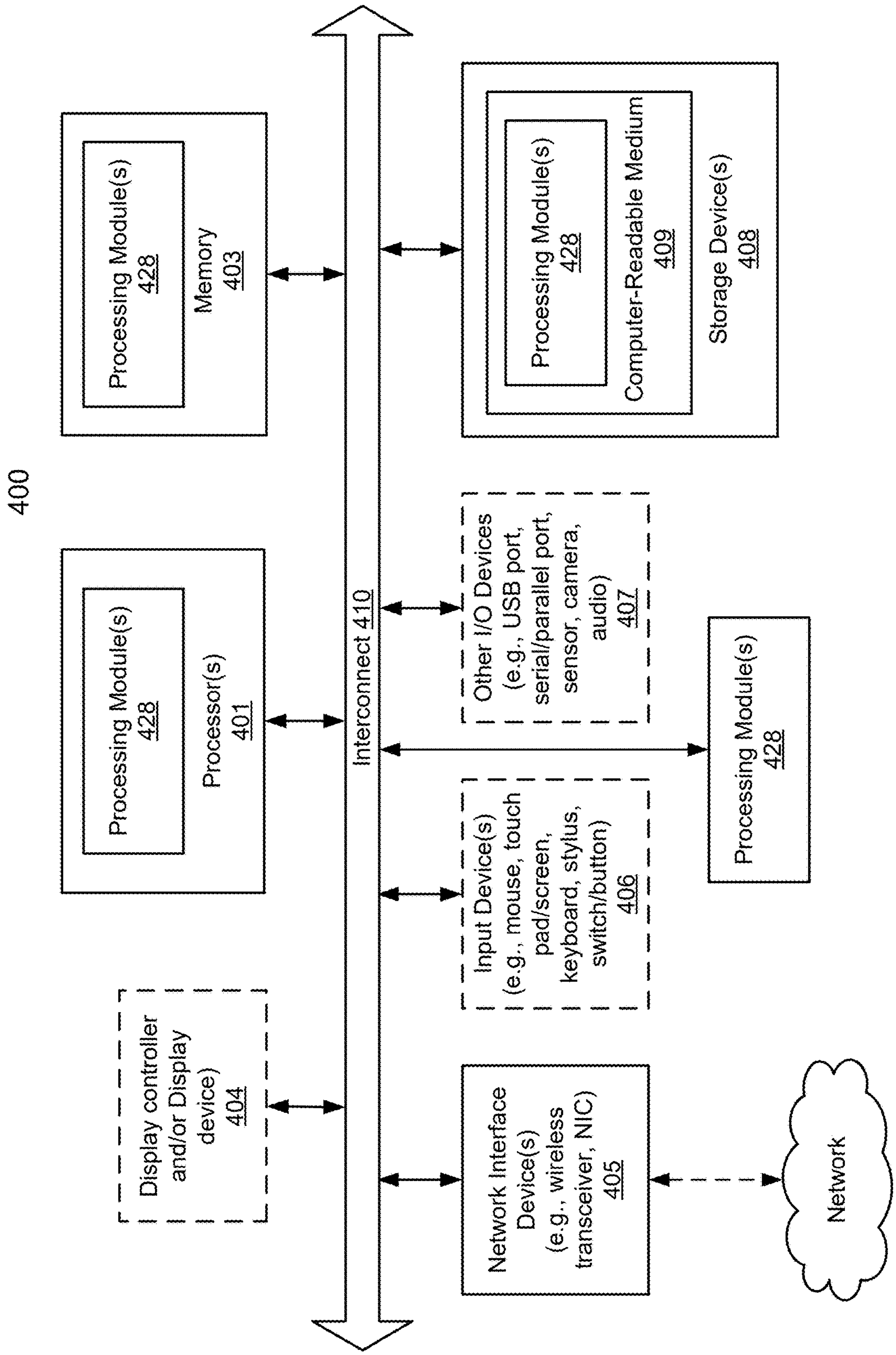
FIG. 4 shows a block diagram illustrating a data processing system in accordance with an embodiment.

Any of the components illustrated in FIGS. 1A-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:

identifying, by a management controller and based on a set of control policies, an occurrence of a policy management event;

based on the occurrence of the policy management event:

identifying, by the management controller and using the set of control policies, a desired state for a discrete graphics component of hardware resources of the data processing system;

updating, by the management controller and based on the desired state, operation of the discrete graphics component to obtain an updated discrete graphics component; and providing, using the updated discrete graphics component, computer implemented services to a user of the data processing system, the computer implemented services conforming to limits specified by the set of control policies, wherein the data processing system comprises a network module adapted to separately advertise network endpoints for the management controller and hardware resources of the data processing system, the network endpoints being usable by a server to address communications to the hardware resources using an in-band communication channel and the management controller using an out-of-band communication channel.

2. The method of claim 1, wherein the set of control policies is defined by a first user of the data processing system and enforced on a second user of the data processing system.

3. The method of claim 2, wherein the set of control policies defines parental limits on use of the data processing system by the second user.

4. The method of claim 3, wherein the parental limits define, at least in part, periods of time when at least one function of the data processing system is to be unavailable to the second user.

5. The method of claim 4, wherein the at least one function of the data processing system depends on access to functionality of the discrete graphics component, and the updated discrete graphics component bars use of the functionality of the discrete graphics component.

6. The method of claim 1, wherein updating the operation of the discrete graphics component comprises:

depowering the discrete graphics component during a period of time specified by the set of control policies.

7. The method of claim 1, wherein updating the operation of the discrete graphics component comprises:

disabling a portion of functionality of the discrete graphics component.

8. The method of claim 1, wherein updating the operation of the discrete graphics component comprises:

blacklisting at least a portion of applications hosted by the hardware resources from invoking functionality of the discrete graphics component.

9. The method of claim 1, wherein the management controller and the network module are on separate power domains from the hardware resources so that the management controller and the network module are operable while the hardware resources are inoperable.

10. The method of claim 1, wherein the out-of-band communication channel runs through the network module, and the in-band communication channel that services the hardware resources also runs through the network module.

11. The method of claim 1, wherein the network module hosts a transmission control protocol/internet protocol (TCP/IP) stack to facilitate network communications via the out-of-band communication channel.

12. A non-transitory machine-readable medium having instructions stored therein, which when executed by a processor, cause the processor to perform operations for managing operation of a data processing system, the operations comprising:

identifying, by a management controller and based on a set of control policies, an occurrence of a policy management event;

based on the occurrence of the policy management event:

identifying, by the management controller and using the set of control policies, a desired state for a discrete graphics component of hardware resources of the data processing system;

updating, by the management controller and based on the desired state, operation of the discrete graphics component to obtain an updated discrete graphics component; and providing, using the updated discrete graphics component, computer implemented services to a user of the data processing system, the computer implemented services conforming to limits specified by the set of control policies, wherein the data processing system comprises a network module adapted to separately advertise network endpoints for the management controller and hardware resources of the data processing system, the network endpoints being usable by a server to address communications to the hardware resources using an in-band communication channel and the management controller using an out-of-band communication channel.

13. The non-transitory machine-readable medium of claim 12, wherein the set of control policies is defined by a first user of the data processing system and enforced on a second user of the data processing system.

14. The non-transitory machine-readable medium of claim 13, wherein the set of control policies defines parental limits on use of the data processing system by the second user.

15. The non-transitory machine-readable medium of claim 14, wherein the parental limits define, at least in part, periods of time when at least one function of the data processing system is to be unavailable to the second user.

16. A data processing system, comprising:

a processor; and a memory coupled to the processor to store instructions, which when executed by the processor, cause the processor to perform operations for managing operation of the data processing system, the operations comprising:

identifying, by a management controller and based on a set of control policies, an occurrence of a policy management event;

based on the occurrence of the policy management event:

identifying, by the management controller and using the set of control policies, a desired state for a discrete graphics component of hardware resources of the data processing system;

updating, by the management controller and based on the desired state, operation of the discrete graphics component to obtain an updated discrete graphics component; and providing, using the updated discrete graphics component, computer implemented services to a user of the data processing system, the computer implemented services conforming to limits specified by the set of control policies, wherein the data processing system comprises a network module adapted to separately advertise network endpoints for the management controller and hardware resources of the data processing system, the network endpoints being usable by a server to address communications to the hardware resources using an in-band communication channel and the management controller using an out-of-band communication channel.

17. The data processing system of claim 16, wherein the set of control policies is defined by a first user of the data processing system and enforced on a second user of the data processing system.

18. The data processing system of claim 17, wherein the set of control policies define parental limits on use of the data processing system by the second user.

19. The data processing system of claim 18, wherein the parental limits define, at least in part, periods of time when at least one function of the data processing system is to be unavailable to the second user.

20. The data processing system of claim 19, wherein the at least one function of the data processing system depends on access to functionality of the discrete graphics component, and the updated discrete graphics component bars use of the functionality of the discrete graphics component.

* * * * *